(12) United States Patent
Rivillon

(10) Patent No.: US 8,877,151 B1
(45) Date of Patent: Nov. 4, 2014

(54) $NO_x$ REDUCTION USING A ZN- AND/OR GA-CONTAINING CATALYST

(71) Applicant: Air Products and Chemicals, Inc., Allentown, PA (US)

(72) Inventor: Sandrine Rivillon, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 14/088,918

(22) Filed: Nov. 25, 2013

(51) Int. Cl.
    *B01D 53/56*     (2006.01)
    *B01D 53/86*     (2006.01)
    *F01N 3/20*     (2006.01)

(52) U.S. Cl.
    CPC .......... *B01D 53/8628* (2013.01); *F01N 3/2066* (2013.01)
    USPC .................... 423/239.2; 422/177; 422/180

(58) Field of Classification Search
    USPC ................ 423/239.2; 422/177, 180
    See application file for complete search history.

(56) References Cited

U.S. PATENT DOCUMENTS

| | | | | |
|---|---|---|---|---|
| 5,736,114 | A | * | 4/1998 | Barthe et al. ............... 423/213.2 |
| 5,899,678 | A | * | 5/1999 | Thomson et al. ................. 431/2 |
| 6,077,493 | A | | 6/2000 | Ueda et al. |
| 7,744,840 | B2 | * | 6/2010 | Sobolevskiy et al. ...... 423/239.1 |
| 2009/0004079 | A1 | * | 1/2009 | Hancu et al. ............... 423/213.5 |
| 2010/0303697 | A1 | | 12/2010 | Sobolevskiy et al. |

FOREIGN PATENT DOCUMENTS

| | | | | | |
|---|---|---|---|---|---|
| EP | 0483715 | A1 | | 5/1992 | |
| JP | 53-083971 | A | * | 7/1978 | .................... 422/177 |
| JP | 6-079140 | A | * | 3/1994 | ................ 423/239.2 |
| JP | 6-205942 | A | * | 7/1994 | ................ 423/239.2 |
| JP | 6-269672 | A | * | 9/1994 | ................ 423/239.2 |
| WO | 0071255 | A1 | | 11/2000 | |

* cited by examiner

*Primary Examiner* — Timothy Vanoy
(74) *Attorney, Agent, or Firm* — Bryan C. Hoke, Jr.

(57) ABSTRACT

Embodiments of the present invention provide systems and processes for selective catalytic reduction of $NO_x$ using hydrogen in conjunction with a catalyst comprising a non-noble metal. In one embodiment, a $NO_x$-containing gas mixture is contacted with a catalyst comprising at least one of zinc and gallium dispersed on a zeolite support to form nitrogen and water.

20 Claims, 3 Drawing Sheets

NO$_x$ REDUCTION USING A ZN- AND/OR GA-CONTAINING CATALYST

BACKGROUND

Combustion of fossil fuels (e.g., in a furnace) produces flue gases containing nitrogen oxides (NO$_x$), which can be harmful to both humans and the environment. It is therefore desirable to remove NO$_x$ from flue gases prior to the flue gases entering the atmosphere.

Various techniques have been developed to control emissions of NO$_x$. Typically, NO$_x$ is reacted to form nitrogen and water using a selective catalytic reduction (SCR) technique in which NO$_x$ reacts with a reducing agent in the presence of a catalyst. In the prior art, ammonia (in a gaseous state, in aqueous solution, or by conversion of compounds such as urea) is often used as a reducing agent in conjunction with a catalyst, such as a tungsten vanadia-titania catalyst. Such SCR systems, however, require ammonia to be transported and stored on site, which can present safety concerns and subject a plant to additional regulations. Further, such SCR systems typically require higher operating temperatures, e.g., 250-500 degrees Celsius (482-932 degrees Fahrenheit), which can necessitate costly equipment modifications to accommodate the temperature required by the SCR systems. For example, a typical flue gas boiler used to recover steam in the convection section of a furnace can be located at a position where the temperature range is similar to that required by the SCR system, e.g., 220-700 degrees Celsius (428-1,292 degrees Fahrenheit). Thus, to recover the same amount of steam in the convection section, the flue gas boiler equipment would typically have to be split.

Other prior art SCR systems use hydrogen as a reducing agent in conjunction with catalysts that comprise a noble metal such as platinum and palladium on a substrate. These SCR systems obviate the need to store ammonia on site and can also operate at lower temperatures (e.g., 100-400 degrees Celsius or 212-752 degrees Fahrenheit). However, the catalysts that comprise noble metals that are used in these systems are costly.

Thus, there is a need in the art for improved SCR systems and processes which use hydrogen as a reducing agent, thereby obviating the need for ammonia and allowing operation at relatively low temperatures, but utilize a less-costly catalyst.

SUMMARY

Embodiments of the present invention satisfy the need in the art by providing systems and processes for selective catalytic reduction of NO$_x$ using hydrogen in conjunction with a catalyst comprising a non-noble metal. Several specific aspects of the systems and processes of the present invention are outlined below.

Aspect 1. A method for selective catalytic reduction of nitrogen oxides in a gas stream, the method comprising:

contacting the gas stream containing the nitrogen oxides with a catalyst in the presence of hydrogen (diatomic hydrogen), wherein the catalyst comprises at least one of zinc and gallium dispersed on a zeolite support, wherein the at least one of zinc and gallium are present on the zeolite support in a mass basis amount greater than any other material dispersed on the zeolite support;

reacting the nitrogen oxides with the hydrogen under reaction conditions sufficient to form nitrogen and water.

Aspect 2. The method of Aspect 1, wherein the zeolite support is aluminosilicate zeolite.

Aspect 3. The method of Aspect 1 or Aspect 2, wherein the zeolite support is ZSM-5.

Aspect 4. The method of any one of Aspects 1 through 3, wherein the reaction conditions sufficient to form nitrogen and water include a reaction temperature ranging from 200 degrees Celsius (392 degrees Fahrenheit) to 300 degrees Celsius (572 degrees Fahrenheit).

Aspect 5. The method of any of Aspects 1 through 4, wherein the hydrogen (H$_2$) is combined with the gas stream prior to contacting the gas stream with the catalyst.

Aspect 6. The method of any one of Aspects 1 through 5, wherein the hydrogen is combined with the gas stream in an amount such that the hydrogen to nitrogen oxides ratio (H$_2$:NO$_x$) is at least 4:1.

Aspect 7. The method of any one of Aspects 1 through 6, wherein at least 80% of pores in the zeolite support have a diameter that is less than or equal to 10 angstroms.

Aspect 8. The method of any one of Aspects 1 through 7 wherein the catalyst further comprises palladium dispersed on the zeolite support.

Aspect 9. The method of any one of Aspects 1 through 8, wherein the catalyst further comprises platinum dispersed on the zeolite support.

Aspect 10. The method of any one of Aspects 1 through 7, wherein the catalyst further comprises at least one noble metal dispersed on the zeolite support, the at least one noble metal selected from the group consisting of ruthenium, rhodium, palladium, silver, osmium, iridium, platinum, and gold.

Aspect 11. The method of Aspect 8, wherein the catalyst is Pd/Zn-ZSM-5.

Aspect 12. The method of any of Aspects 1 though 11, wherein the zinc concentration of the catalyst is greater than or equal to 1.0 wt % of the overall weight of the catalyst.

Aspect 13. The method of any one of Aspects 8, or 10 through 12, wherein the palladium concentration of the catalyst is greater than or equal to 0.5 wt % and less than or equal to 2.0 wt % of the overall weight of the catalyst.

Aspect 14. The method of Aspect 8, wherein the palladium concentration is greater than or equal to 0.8 wt % and less than or equal to 1.2 wt % of the overall weight of the catalyst, and the zinc concentration of the catalyst is greater than or equal to 1.0 wt % and less than or equal to 2.0 wt % of the overall weight of the catalyst.

Aspect 15. The method of any one of Aspects 1 through 14, wherein the nitrogen oxides are reacted with the hydrogen such that at least 55% of the nitrogen oxides are converted to form at least nitrogen and water.

Aspect 17. The method of any one of Aspects 1 through 16, wherein the gas stream has a carbon monoxide concentration of no more than 2,000 ppm.

Aspect 18. A system for reducing nitrogen oxides in a gas stream, the system comprising:

a furnace for producing the gas stream, the gas stream containing the nitrogen oxides;

a supply of a hydrogen-containing gas;

a reactor, the reactor being operatively connected to the furnace to receive the gas stream from the furnace, the reactor being operatively connected to the supply of the hydrogen-containing gas to receive the hydrogen-containing gas, the reactor being configured to operate at a temperature ranging from 200 degrees Celsius (392 degrees Fahrenheit) to 300 degrees Celsius (572 degrees Fahrenheit), the reactor containing a catalyst comprising at least one of zinc and gallium dispersed on a zeolite support, wherein the at least one of zinc and gallium are present on the zeolite support in a mass basis amount greater than any other material dispersed on the zeolite support.

Aspect 19. The system of Aspect 18, wherein the furnace is part of a steam methane reforming system.

Aspect 20. The system of Aspect 18 or Aspect 19, wherein the zeolite support is aluminosilicate zeolite.

Aspect 21. The system of any one of Aspects 18 through 20 wherein the zeolite support is ZSM-5.

Aspect 22. The system of any one of Aspects 18 through 21 wherein at least 80% of pores in the zeolite support have a diameter that is less than or equal to 10 angstroms.

Aspect 23. The system of any one of Aspects 18 through 22, wherein the catalyst further comprises platinum dispersed on the zeolite support.

Aspect 24. The system of any one of Aspects 18 through 23, wherein the catalyst further comprises palladium dispersed on the zeolite support.

Aspect 25. The system of any one of Aspects 18 through 22, wherein the catalyst further comprises at least one noble metal dispersed on the zeolite support, the at least one noble metal selected from the group consisting of ruthenium, rhodium, palladium, silver, osmium, iridium, platinum, and gold.

Aspect 26. The system of Aspect 24, wherein the catalyst is Pd/Zn-ZSM-5.

Aspect 27. The system of any one of Aspects 18 through 26, wherein the zinc concentration of the catalyst is greater than or equal to 1.0 wt % of the overall weight of the catalyst.

Aspect 28. The method of any one of Aspects 24 through 27 wherein the palladium concentration of the catalyst is greater than or equal to 0.5 wt % and less than or equal to 2.0 wt % of the overall weight of the catalyst.

Aspect 29. The system of any one of Aspects 24 through 28 wherein the palladium concentration is greater than or equal to 0.8 wt % and less than or equal to 1.2 wt % of the overall weight of the catalyst, and the zinc concentration of the catalyst is greater than or equal to 1.0 wt % and less than or equal to 2.0 wt % of the overall weight of the catalyst.

Aspect 30. The method of any one of Aspects 1 through 17, wherein the gas stream containing the nitrogen oxides is a combustion flue gas of a furnace of a steam methane reforming system.

BRIEF DESCRIPTION OF SEVERAL VIEWS OF THE DRAWINGS

The present invention will hereinafter be described in conjunction with the appended drawing figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the scope of the invention, as set forth in the appended claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity. The term "and/or" placed between the last two entities of a list of 3 or more entities means at least one of the entities in the list including any specific combination of entities in this list.

The term "conduit," as used in the specification and claims, refers to one or more structures through which fluids can be transported between two or more components of a system. For example, conduits can include pipes, tubes, ducts, manifolds, and the like, and combinations thereof that transport liquids and/or gases at varying pressures throughout a system.

Figure 1:
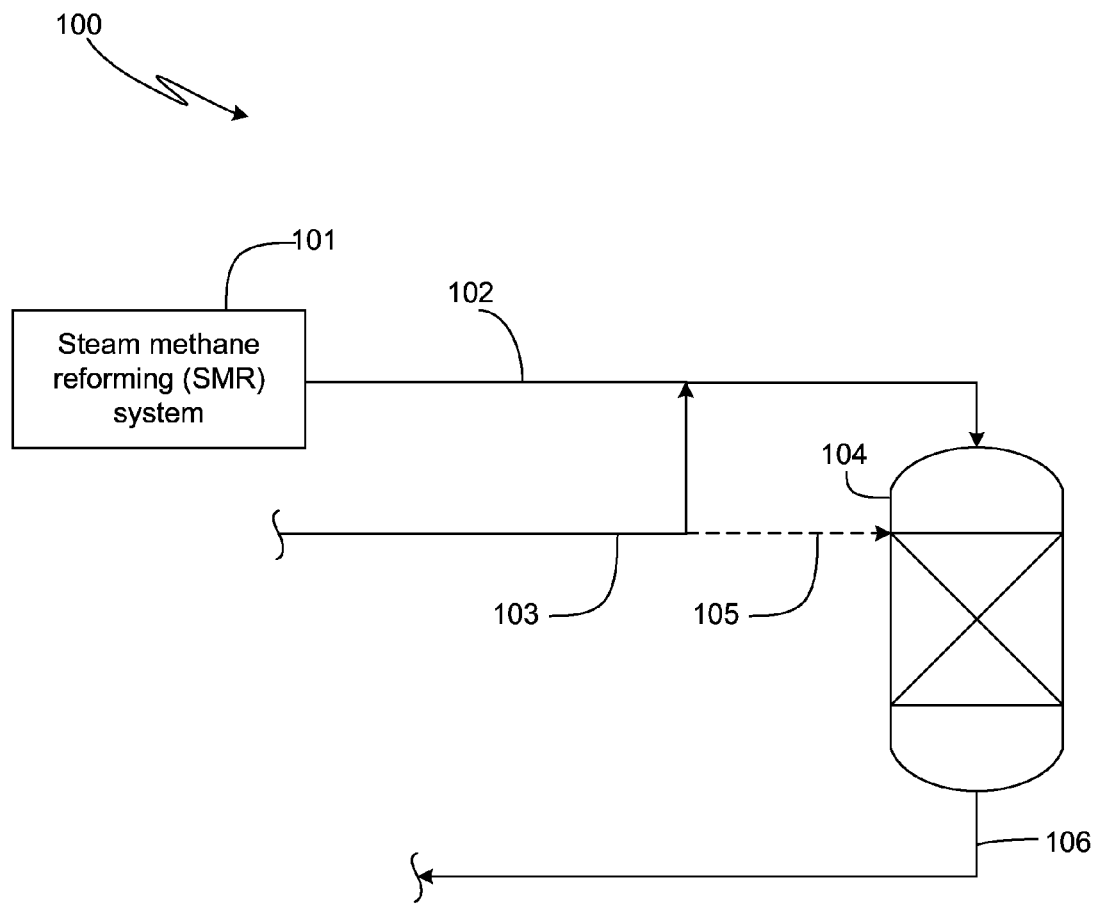
FIG. 1 is a block diagram of a selective catalytic reduction system in accordance with an embodiment of the present invention.

The term "fluid flow communication," as used in the specification and claims, refers to the nature of connectivity between two or more components that enables liquids and/or gases to be transported between the components in a controlled fashion. For example, a conduit can be in fluid flow communication with an outlet of a heat exchanger and an inlet of a reactor such that gas can be transported therebetween without leakage. Coupling two or more components such that they are in fluid flow communication with each other can involve any suitable method known in the art, such as with the use of flanged conduits, gaskets, and bolts. In FIG. 1, conduits are depicted as lines with arrows connecting one or more other components of the system. Each such conduit is fluidly connected to an outlet of a component (i.e., the component from which the line originates) and an inlet of another component (i.e., the component at which the arrow terminates), such that a gas and/or liquid can be carried therebetween.

As used herein, the term "catalyst" refers to a support (e.g., zeolite), catalytic material (e.g., zinc), and any other additives which may be present on the support. The overall weight of the catalyst is the sum of the weights of the support, the catalytic material present on the support, and any other additive which may be present on the support.

As used herein, the term "noble metal" refers to metals in the group consisting of: ruthenium, rhodium, palladium, silver, osmium, iridium, platinum, and gold.

As used herein, the term hydrogen refers to diatomic hydrogen ($H_2$).

As used herein, the term "nitrogen selectivity" refers to the extent to which $NO_x$ is converted to nitrogen ($N_2$) as opposed to other products. For example, 80% nitrogen selectivity means that of the $NO_x$ that is converted, 80% is converted to nitrogen while the remaining 20% is converted to products other than nitrogen.

The terms "nitrogen oxide-containing gas" or "$NO_x$-containing gas," as used in the specification and claims, both mean a gas containing one or more nitrogen oxide species (e.g., NO, $NO_2$), at a total concentration of nitrogen oxides of at least 40 ppm.

FIG. 1 is a block diagram of a selective catalytic reduction (SCR) system 100 in accordance with an embodiment of the present invention. A steam methane reforming (SMR) system 101 produces a $NO_x$-containing gas (e.g., flue gas from a reforming furnace of the SMR system 101), which is carried from the SMR system 101 via conduit 102. In other embodiments, other sources of the $NO_x$-containing gas can be used, including other types of reforming systems. See, for example, U.S. Pat. No. 7,427,388 for a non-exhaustive overview of different reforming techniques, including steam methane reforming.

A hydrogen-containing gas, carried via conduit 103 from a hydrogen gas supply (not shown), is combined with the $NO_x$-containing gas carried by conduit 102 to form a gas mixture which is then fed to a selective catalytic reduction reactor (SCRR) 104. Examples of suitable hydrogen gas supplies include product hydrogen gas and pressure swing adsorption (PSA) purge gas. Alternatively, the hydrogen-containing gas can be carried via conduit 105 to the SCRR 104, where it is mixed with the $NO_x$-containing gas fed to the SCRR 104 via conduit 102.

In order to provide a preferred amount of $NO_x$ conversion in the SCRR 104, it is necessary for the gas mixture to have an $H_2$ to $NO_x$ ratio of at least 4:1. In this embodiment, however, the preferred $H_2$ to $NO_x$ ratio in the gas mixture is preferably at least 20:1 and, more preferably, at least 40:1. This is due to the presence of significant concentrations of $O_2$ in flue gas from an SMR system 101, which will consume $H_2$ in the SCRR 104. In addition, it is preferable that the carbon monoxide (CO) concentration of the $NO_x$-containing gas is less than or equal to 2,000 ppm.

Within the SCRR 104, $NO_x$ in the gas mixture is contacted with a catalyst comprising at least one non-noble metal in the presence of hydrogen at a temperature less than or equal to 350 degrees Celsius (662 degrees Fahrenheit), as a result of which $NO_x$ is converted into nitrogen and water. In this embodiment, the preferred operating temperature range of the SCRR 104 is between 200 degrees Celsius (392 degrees Fahrenheit) and 300 degrees Celsius (572 degrees Fahrenheit). More preferably, the operating temperature of the SCRR 104 is between 240 degrees Celsius (464 degrees Fahrenheit) and 260 degrees Celsius (500 degrees Fahrenheit). Preferably, the $NO_x$ conversion rate is at least 55% and the nitrogen selectivity is at least 80%.

The process is operable at subatmospheric to superatmospheric pressure, e.g. at 34.5 kPa (5 psia) to 3.45 MPa (500 psia), or at 68.9 kPa (10 psia) to 3.45 kPa (50 psia), or at near atmospheric pressure.

The SCRR 104 is preferably implemented with a catalyst comprising Zn and/or Ga. A noble metal can also be added to the catalyst to enhance NOx conversion and nitrogen selectivity. In embodiments where the catalyst includes a noble metal, the zinc and/or gallium are preferably present on the catalyst support in a mass basis amount greater than the noble metal and any other material dispersed on the support. Exemplary catalyst compositions are discussed in greater detail below. In this exemplary embodiment, the SCRR 104 includes one or more catalytic monoliths. For example, the SCRR 104 can be implemented with one or more square-channel and/or corrugated-plate monoliths. In other embodiments, other suitable catalyst arrangements may be used, including, but not limited to, random packing of spheres and cylinders, and catalysts that use foam supports.

Conduit 106 carries the $NO_x$-depleted effluent (i.e., cleaned flue gas) from the SCRR 104, where it may be further treated, utilized in another system, or vented to the atmosphere.

As noted above, the present invention utilizes hydrogen as a reducing agent instead of ammonia. Using hydrogen as the reducing agent eliminates safety and regulatory concerns related to the transportation and storage of ammonia, and also permits the catalytic reduction of $NO_x$ to take place at lower temperatures (e.g., 100-350 degrees Celsius or 212-662 degrees Fahrenheit, as compared to 250-500 degrees Celsius or 482-932 degrees Fahrenheit with ammonia), thereby obviating costly equipment modifications that may be needed to accommodate a typical SCR system (e.g., splitting flue gas boiler equipment). Further, embodiments of the present invention advantageously utilize a catalyst where zinc and/or gallium is the primary constituent, which is considerably less expensive than a catalyst where a noble metal is the primary constituent.

In a preferred embodiment, the SCRR 104 utilizes a zinc-based catalyst on a zeolite support, such as Zn-ZSM-5 catalyst. It is believed that the zinc contained in the pores of the Zn-ZSM-5 zeolite exists as a cation in order to maintain charge balance. Therefore, as used in the claims, the term "zinc" is intended to be inclusive of zinc cations.

In other embodiments, other non-noble metals such as gallium, or a combination of zinc and gallium, can be used. Like zinc, gallium contained in the pores of ZSM-5 zeolite is also believed to exist as cations and, therefore, as used in the claims, the term "gallium" is intended to be inclusive of gallium cations. Similarly, other zeolites and porous supports can be used as long as non-noble metal cations are present on the support to catalyze the reaction (or reduction) of $NO_x$ with hydrogen. For example, Zn—Y catalyst, which was also found to catalyze dissociation of hydrogen, can be prepared in the same manner as Zn-ZSM-5, but using Zeolite Y (i.e., faujasite) instead of ZSM-5. Preferably, embodiments of the present invention utilize catalyst supports in which at least 80% of the pores have a diameter that is less than or equal to 10 angstroms in size.

In another exemplary embodiment, the SCRR 104 utilizes a Pd/Zn-ZSM-5 catalyst. The Pd/Zn-ZSM-5 catalyst includes a non-noble metal, zinc, as the principal catalyzing component, in combination with a noble metal, palladium, for enhanced NOx conversion and nitrogen selectivity. Preferably, the concentration of noble metal is between 0.4 wt % and 2.0 wt % of the overall weight of the catalyst. More preferably, the concentration of noble metal is between 0.8 wt % and 1.2 wt % of the overall weight of the catalyst. Preferably, the concentration of non-noble metal (in this case, zinc) is between 0.5 wt % and 3.0 wt % of the overall weight of the catalyst, and, more preferably, the concentration is between 1.0 wt % and 2.0 wt % of the overall weight of the catalyst. In other embodiments, other noble metals, such as platinum, can be used in conjunction with zinc and/or gallium to enhance catalytic performance. While the individual ranges of preferred noble metal and non-noble metal concentrations overlap, it should be understood that, as discussed above, it is preferable for the non-noble metal concentration to exceed that of the noble metal i.e., have a greater wt %.

EXAMPLES

The following are examples in which an SCR system is operated in accordance with exemplary embodiments of the present invention. The examples illustrate catalytic activity of the Zn-ZSM-5 catalyst and the Pd/Zn-ZSM-5 catalyst, as described above. In each example, NO concentrations of the $NO_x$-depleted effluent of the SCR system were continually monitored using a chemiluminescent $NO/NO_x$ analyzer; bulk gas compositions were measured using gas chromatography. The catalytic activity measurements were made after the reactions reached steady state, which, depending on the reaction, occurred around 1-2 hours after starting the experiment.

Example 1

In this example, powdered Zn-ZSM-5 catalyst was prepared as follows: the ammonium form of aluminosilicate zeolite ZSM-5 (i.e., Zeolite Socony Mobil-5), having a framework Silicon/Aluminum ratio of approximately 25, was calcined at approximately 500 degrees Celsius (932 degrees Fahrenheit) to remove ammonium ions and produce H-ZSM-5, the hydrogen form of ZSM-5; the H-ZSM-5 zeolite was ion exchanged with a 0.01 M solution of $Zn(NO_3)_2$ at approximately 80 degrees Celsius (176 degrees Fahrenheit) overnight (e.g., approximately 12 hours) to produce Zn-ZSM-5 zeolite; the Zn-ZSM-5 zeolite was collected by centrifugation, after which it was washed with de-ionized water, dried in an oven at approximately 110 degrees Celsius (230 degrees Fahrenheit), and treated in vacuum at approximately 350 degrees Celsius (662 degrees Fahrenheit) for approximately 24 hours. To optimize the Zn concentration in ZSM-5, the ion exchange process can be repeated multiple times. Here, the ion exchange process was performed four times, yielding Zn-ZSM-5 catalyst having a zinc content of approximately 1.94 wt %.

In this example, 200 mg of the powdered Zn-ZSM-5 catalyst was placed in a fixed-bed quartz reactor, and catalytic reactions of a gas mixture having the components shown in the first column of Table 1 were conducted. Reaction conditions and amounts of components in the gas mixture were varied within the ranges shown in the second column of Table 1 in order to identify combinations that produced desired $NO_x$ conversion and nitrogen selectivity. The third column of Table 1 shows a gas mixture composition having a $H_2/NO$ ratio of 40/1 and reaction conditions that resulted in a $NO_x$ conversion rate of 55% and nitrogen selectivity of 80%.

Figure 2A:
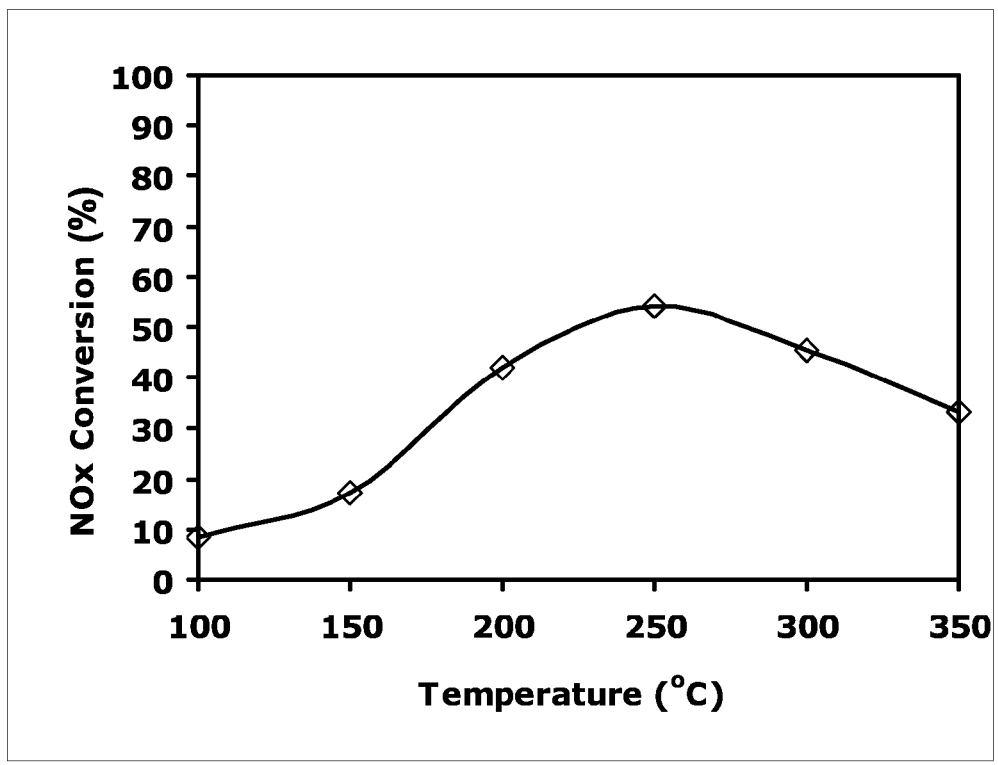
FIGS. 2A and 2B are graphs showing ranges of $NO_x$ conversion rates and nitrogen selectivity, respectively, achieved using a selective catalytic reduction system in accordance with an embodiment of the present invention.
Figure 2B:
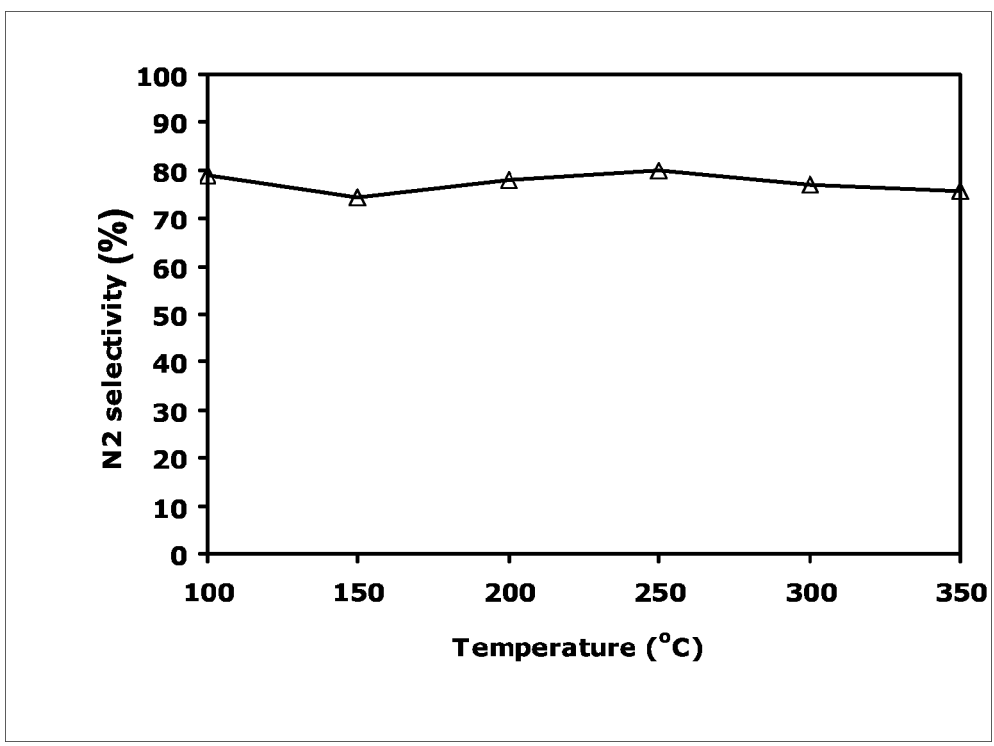

FIGS. 2A and 2B show graphs of $NO_x$ conversion and nitrogen selectivity, respectively, for the mixture composition and reaction conditions provided in the third column of Table 1 across the range of temperatures provided in the second column of Table 1.

TABLE 1

| Gas Mixture Composition | Range | $H_2/NO = 40/1$ |
|---|---|---|
| NO | 50-200 ppm | 50 ppm |
| $H_2$ | 200-3,000 ppm | 2000 ppm |
| $O_2$ | 1-4.5 vol % | 1.5 vol % |
| CO | 0-2,000 ppm | N/A |
| $H_2O$ | 17.5 vol % | N/A |
| He | Balance | Balance |
| Reaction conditions | | |
| Flow rate of mixture | 100 or 200 ml/min | 200 ml/min |
| Temperature | 100-350° C. | 250° C. |
| Results | | |
| $NO_x$ conversion | 10-55% | 55% |
| Nitrogen selectivity | 40-80% | 80% |

Example 2

In this example, powdered Pd/Zn-ZSM-5 was prepared via incipient wetness impregnation of Zn-ZSM-5 in an aqueous solution of $Pd(NH_3)_4Cl_2$. The solid sample was then dried at approximately 120 degrees Celsius (248 degrees Fahrenheit) for approximately 12 hours and calcined in air at approximately 500 degrees Celsius (932 degrees Fahrenheit) for approximately 6 hours. To optimize the palladium concentration, the ion exchange process can be repeated multiple times. Here, the ion exchange process was performed once, yielding a Pd/Zn-ZSM-5 catalyst having a palladium content of approximately 1.0 wt % and a zinc content of approximately 1.17 wt %.

In this example, 200 mg of the powdered Pd/Zn-ZSM-5 catalyst was placed in a fixed-bed quartz reactor, and a gas mixture having the components shown in the first column of Table 2 was contacted with the Pd/Zn-ZSM catalyst. As in Example 1, reaction conditions and amounts of components in the gas mixture were varied within the ranges shown in the second column of Table 2 in order to identify combinations that produced desired $NO_x$ conversion and nitrogen selectivity. The third column of Table 2 shows a gas mixture composition having a $H_2/NO$ ratio of 40/1 and reaction conditions that resulted in a $NO_x$ conversion rate of 60% and nitrogen selectivity of 98%.

Figure 3A:
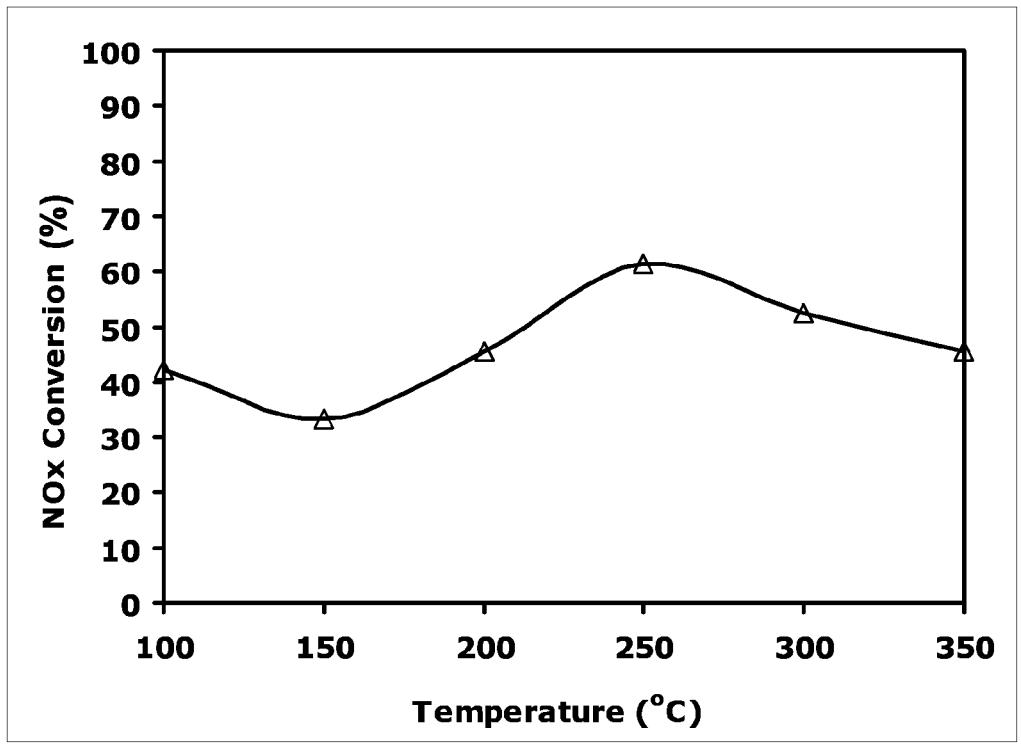
FIGS. 3A and 3B are graphs showing ranges of $NO_x$ conversion rates and nitrogen selectivity, respectively, achieved using a selective catalytic reduction system in accordance with another embodiment of the present invention.
Figure 3B:
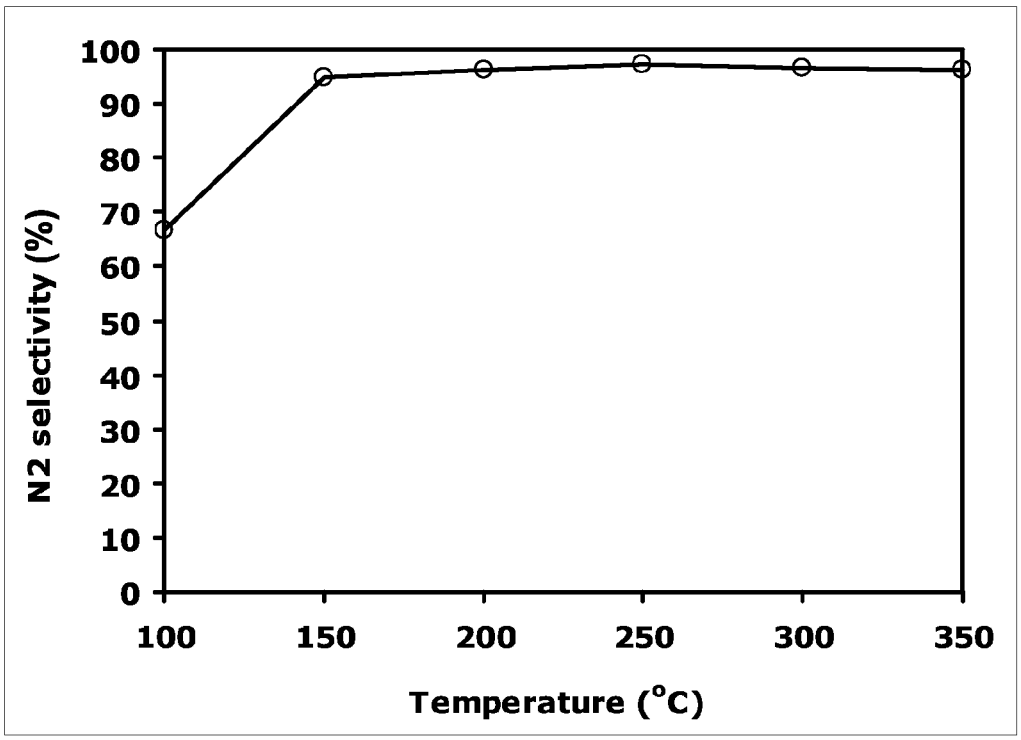

FIGS. 3A and 3B show graphs of $NO_x$ conversion and nitrogen selectivity, respectively, for the mixture composition and reaction conditions provided in the third column of Table 2 across the range of temperatures provided in the second column of Table 2.

Example 3

In this example, the effect of carbon monoxide on the Zn-ZSM-5 and Pd/Zn-ZSM-5 catalysts was observed by measuring reductions in NO conversion for various concentrations of CO added. A gas mixture (NO, $H_2$, $O_2$, $H_2O$, and CO) was prepared having the composition provided in Table 3. The gas mixture was provided to each of the fixed-bed quartz reactors under the conditions specified provided in Table 3.

The second column of Table 4 shows the initial NO conversion rate and $N_2$-selectivity for each catalyst (i.e., CO concentration=0 ppm); the subsequent columns of Table 4 show the NO conversion rate and $N_2$-selectivity for each catalyst when exposed to various CO concentration at 250 degrees Celsius (482 degrees Fahrenheit). As shown, for both the Zn-ZSM-5 catalyst and the Pd/Zn-ZSM-5 catalyst, the NO conversion rate decreased by less than 15% up to 1000 ppm of CO and then remained almost unchanged for CO concentrations higher than 1000 ppm. Accordingly, these results suggest that the addition of palladium to the catalyst does not significantly alter the effects of CO concentration present in the gas mixture on NO conversion over time. The same observation is made for $N_2$-selectivity.

TABLE 2

| Gas Mixture Composition | Range | $H_2/NO = 40/1$ |
|---|---|---|
| NO | 50-200 ppm | 50 ppm |
| $H_2$ | 200-3,000 ppm | 2,000 ppm |
| $O_2$ | 1-4.5 vol % | 1.5 vol % |
| CO | 0-2,000 ppm | N/A |
| $H_2O$ | 17.5 vol % | N/A |
| He | Balance | Balance |
| Reaction conditions | | |
| Flow rate of mixture | 100 or 200 ml/min | 200 ml/min |
| Temperature | 100-350° C. | 250° C. |
| Results | | |

TABLE 2-continued

| Gas Mixture Composition | Range | $H_2/NO = 40/1$ |
|---|---|---|
| $NO_x$ conversion | 42-60% | 60% |
| Nitrogen selectivity | 75-98% | 98% |

TABLE 3

| Gas Mixture Composition | Conditions |
|---|---|
| NO | 50 ppm |
| $H_2$ | 2,000 ppm |
| $O_2$ | 1.5 vol % |
| CO | 0-up to 2000 ppm |
| $H_2O$ | 17.5 wt % |
| He | Balance |
| Flow rate of mixture | 200 ml/min |
| Temperature | 250° C. |

TABLE 4

NO conversion ($N_2$-selectivity) at 250° C.

| | CO conc. | | | | |
|---|---|---|---|---|---|
| Catalyst | 0 ppm | 500 ppm | 1000 ppm | 1500 ppm | 2000 ppm |
| Zn-ZSM-5 | 40% (82%) | 36% (89%) | 34% (89%) | 32% (82%) | 32% (82%) |
| Pd/Zn-ZSM-5 | 60% (98%) | 59% (91%) | 52% (91%) | 50% (90%) | 49% (90%) |

While the principles of the invention have been described above in connection with preferred embodiments, it is to be clearly understood that this description is made only by way of example and not as a limitation of the scope of the invention.

The invention claimed is:

1. A method for selective catalytic reduction of nitrogen oxides in a gas stream, the method comprising:
   contacting the gas stream containing the nitrogen oxides (NOx) with a catalyst in the presence of hydrogen ($H_2$), wherein the catalyst comprises at least one of zinc and gallium dispersed on a zeolite support, wherein the at least one of zinc and gallium are present on the zeolite support in a mass basis amount greater than any other material dispersed on the zeolite support;
   reacting the nitrogen oxides (NOx) with the hydrogen ($H_2$) under reaction conditions sufficient to form nitrogen and water.

2. The method of claim 1, wherein the zeolite support is aluminosilicate zeolite.

3. The method of claim 1, wherein the zeolite support is ZSM-5.

4. The method of claim 1, wherein the reaction conditions sufficient to form nitrogen and water include a reaction temperature ranging from 200 degrees Celsius (392 degrees Fahrenheit) to 300 degrees Celsius (572 degrees Fahrenheit).

5. The method of claim 1, wherein the hydrogen is combined with the gas stream prior to contacting the gas stream with the catalyst.

6. The method of claim 1, wherein the gas stream containing the nitrogen oxides (NOx) is contacted with the catalyst in the presence of hydrogen ($H_2$) at a hydrogen to nitrogen oxides ratio ($H_2:NO_x$) is at least 4:1.

7. The method of claim 1, wherein the catalyst further comprises at least one noble metal dispersed on the zeolite support, the at least one noble metal selected from the group consisting of ruthenium, rhodium, palladium, silver, osmium, iridium, platinum, and gold.

8. The method of claim 1, wherein the catalyst further comprises platinum dispersed on the zeolite support.

9. The method of claim 1, wherein the catalyst further comprises palladium dispersed on the zeolite support.

10. The method of claim 9, wherein the catalyst is Pd/Zn-ZSM-5.

11. The method of claim 10, wherein the zinc concentration of the catalyst is greater than or equal to 1.0 wt % of the overall weight of the catalyst.

12. The method of claim 10, wherein the palladium concentration of the catalyst is greater than or equal to 0.5 wt % and less than or equal to 2.0 wt % of the overall weight of the catalyst.

13. The method of claim 10, wherein the palladium concentration is greater than or equal to 0.8 wt % and less than or equal to 1.2 wt % of the overall weight of the catalyst, and the zinc concentration of the catalyst is greater than or equal to 1.0 wt % and less than or equal to 2.0 wt % of the overall weight of the catalyst.

14. The method of claim 1, wherein the nitrogen oxides are reacted with the hydrogen such that at least 55% of the nitrogen oxides are converted to form at least nitrogen and water.

15. The method of claim 1, wherein the gas stream has a carbon monoxide concentration of no more than 2,000 ppm.

16. A system for reducing nitrogen oxides in a gas stream, the system comprising:
   a furnace for producing the gas stream, the gas stream containing the nitrogen oxides;
   a supply of a hydrogen-containing gas;
   a reactor, the reactor being operatively connected to the furnace to receive the gas stream from the furnace, the reactor being operatively connected to the supply of the hydrogen-containing gas to receive the hydrogen-containing gas, the reactor being configured to operate at a temperature ranging from 200 degrees Celsius (392 degrees Fahrenheit) to 300 degrees Celsius (572 degrees Fahrenheit), the reactor containing a catalyst comprising at least one of zinc and gallium dispersed on a zeolite support, wherein the at least one of zinc and gallium are present on the zeolite support in a mass basis amount greater than any other material dispersed on the zeolite support.

17. The system of claim 16, wherein the furnace is part of a steam methane reforming system.

18. The system of claim 16, wherein the zeolite support is an aluminosilicate zeolite.

19. The system of claim 16, wherein the catalyst further comprises at least one noble metal dispersed on the zeolite support, the at least one noble metal selected from the group consisting of ruthenium, rhodium, palladium, silver, osmium, iridium, platinum, and gold.

20. The system of claim 16, wherein the zinc concentration of the catalyst is greater than or equal to 1.0 wt % of the overall weight of the catalyst.

* * * * *